(No Model.)
J. F. WILLIAMS.
BELT FASTENER.
No. 524,432. Patented Aug. 14, 1894.
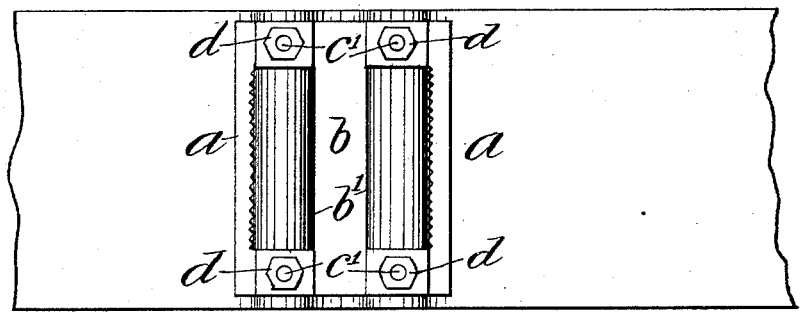
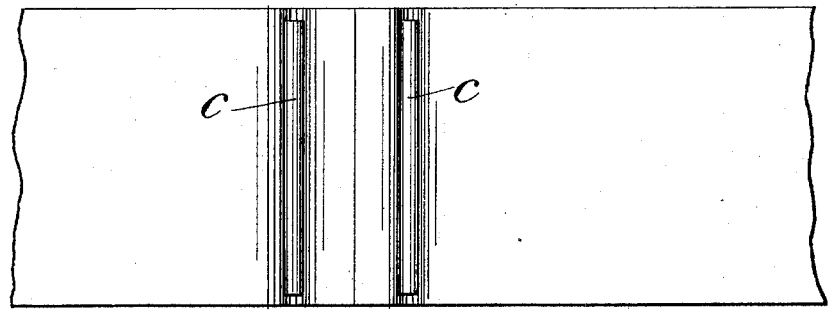
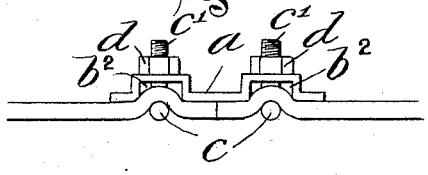
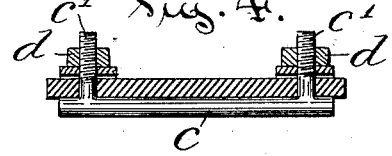
Witnesses:
Joseph Arthur Cantin
Arthur B. Jenkins
Inventor:
John F. Williams
by Simonds, Burdett & Frothingham,
Attorneys,

UNITED STATES PATENT OFFICE.

JOHN F. WILLIAMS, OF WASSAIC, NEW YORK.

BELT-FASTENER.

SPECIFICATION forming part of Letters Patent No. 524,432, dated August 14, 1894.

Application filed January 26, 1894. Serial No. 498,129. (No model.)

*To all whom it may concern:*

Be it known that I, JOHN F. WILLIAMS, a citizen of the United States, and a resident of Wassaic, in the county of Dutchess and State of New York, have invented certain new and useful Improvements in Belt-Fasteners, of which the following is a full, clear, and exact description, whereby any one skilled in the art can make and use the same.

The object of my invention is to provide a device for fastening the ends of a belt used in the transmission of power and one which can be easily applied to or removed from the belt and which will hold the end securely.

To this end my invention consists in the details of the several parts making up the belt fastener as a whole and in the combination of the parts as more particularly hereinafter described and pointed out in the claims.

Referring to the drawings: Figure 1 is a top view of the fastener as used in uniting the ends of a belt. Fig. 2 is a detail bottom view of the same. Fig. 3 is a detail edge view of the same. Fig. 4 is a detail view in transverse section through the fastener and belt on plane passing through one of the transverse sockets.

In the accompanying drawings the letter $a$ denotes the body part of the fastener which is a flat plate of metal cast or wrought to shape in any desired manner. This body part $a$ has on each side of the center of the plate and near the opposite ends sockets $b$ consisting in part of the slots $b'$ and in part of the recess $b^2$ which opens to the under surface of the plate and is raised above the plane of the body part $a$ sufficient distance to enable the material in the belt to be drawn into the socket by the pull of the yokes $c$. The yoke $c$ consists of a bar with upturned arms $c'$ which extend through openings in the plate and are threaded to receive a nut $d$ by means of which the yoke may be drawn toward the body of the fastener so as to clamp the end of the belt between it and the plate. These arms $c'$ are preferably arranged at a little distance from the ends of the yoke in order to provide for a more even pull upon the latter in clamping the end of the belt.

The fastener as a whole is used to fasten a belt by making holes through the belt near the end and in position to allow the arms $c'$ to be thrust through the holes, the yoke lying on the under surface of the belt. These arms are then passed through the openings in the plate and the nuts screwed on them, the surface of the belt being drawn into the sockets $b$, the edges of the slot $b'$ being roughened so as to give a better clamping hold to prevent the withdrawal of the belt from the hold of the clamp. The ends of the belt meet, as shown in Fig. 3 of the drawings, when the fastener is secured in place.

An important feature of the invention resides in the recessed belt plate which provides for the displacement of the substance of the belt to an extent sufficient to enable the yoke or bar of the clamp device to be embedded in the lower surface of the belt so as to remove any projection from the under surface which otherwise might interfere with the use of the belt by contact with the surface of a pulley over which the belt runs in use.

I claim as my invention—

1. In a belt fastener, in combination, a body part having transverse clamp sockets near the opposite ends forming recesses on the under surface of the plate, and the yokes underlying said clamp sockets and having threaded arms extending through openings in the plate and provided with clamping nuts, all substantially as described.

2. In a belt fastener, in combination, a body part having transverse clamp sockets including a slot with serrated or roughened edges, recesses on the under surface of the plate in continuation of the slots, the yoke having the threaded arms adapted to extend through openings in the upper wall of the sockets in the plate and nuts fitting the threaded ends of the arms, all substantially as described.

JOHN F. WILLIAMS.

Witnesses:
JOHN G. DOYLE,
ELBERT A. BURCH.